J. F. FORSYTH.
RAIL JOINT.
APPLICATION FILED JAN. 30, 1913.
1,061,907.
Patented May 13, 1913.
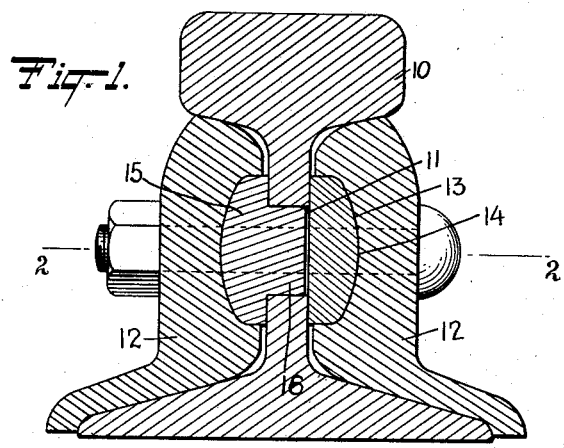
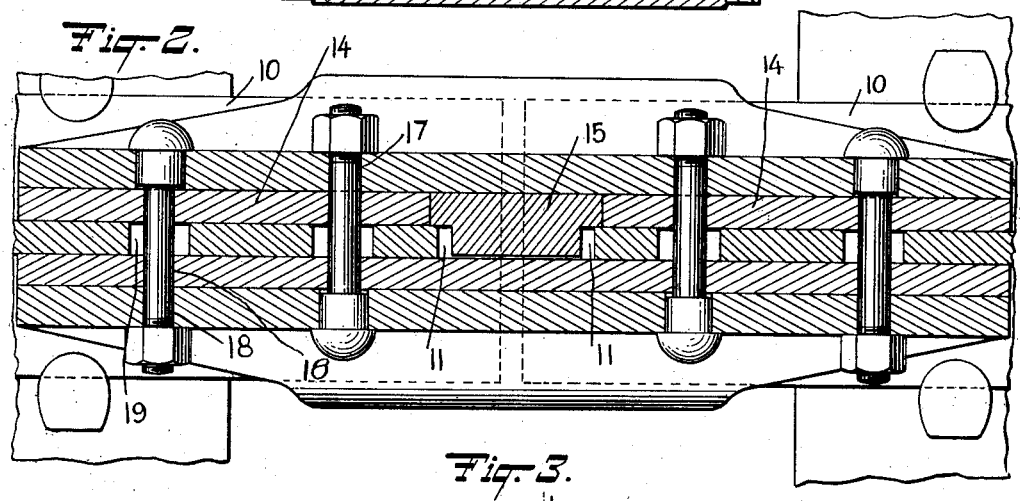
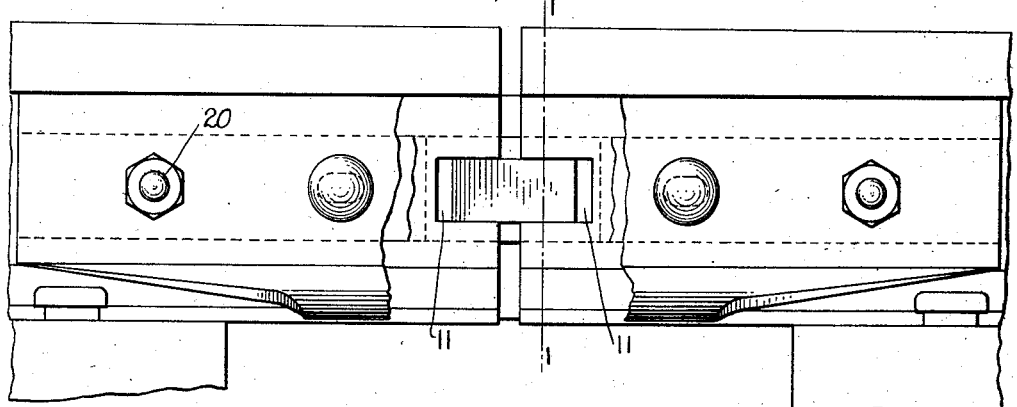
WITNESSES
George Bambay
B Joffe
INVENTOR
John F. Forsyth
BY
ATTORNEYS

UNITED STATES PATENT OFFICE.

JOHN F. FORSYTH, OF BLOOMINGTON, INDIANA, ASSIGNOR OF ONE-THIRD TO HORACE BLAKELY, OF BLOOMINGTON, INDIANA.

RAIL-JOINT.

1,061,907.  Specification of Letters Patent.  Patented May 13, 1913.

Application filed January 30, 1913. Serial No. 745,120.

*To all whom it may concern:*

Be it known that I, JOHN F. FORSYTH, a citizen of the United States, and a resident of Bloomington, in the county of Monroe and State of Indiana, have invented a new and Improved Rail-Joint, of which the following is a full, clear, and exact description.

This invention has for its object the provision of an inexpensive, reliable rail joint, which will have the same efficiency and safety under great difference of temperature, and which will increase the bending resistance of the joint. The rail joint comprises splice plates provided with fillers, having a higher coefficient of friction with the rail than the plates and having a key in one of said plates engaging the webs of the rails.

Reference is to be had to the accompanying drawings, constituing a part of this specification, in which similar characters of reference denote corresponding parts in all the views and in which—

Figure 1 is a sectional view on the line 1—1 Fig. 3; Fig. 2 is a horizontal section on line 2—2 Fig. 1; and Fig. 3 is a side elevation of the joint, the splice plate being partly broken, showing the key engaging the recesses formed in the extremities of the webs of the rail.

Referring to the drawings, 10 represents a rail, in the extremity of which a recess 11 is provided in the web of the rail. Engaging the ends of the rails 10 are splice plates 12 abutting with their lower edge against the flange of the rail, and with their upper edge against the head of the rail as best shown in Fig. 1. The splice plate 12 has the face lying opposite the web of the rail provided with a longitudinal groove 13 extending through the entire length of the plate, and having its bottom slightly curved. Fitted in the longitudinal groove 13 is a wooden filler 14. In one of the plates, the filler is formed of two pieces, or a central portion of the filler is cut away, and a key 15 is positioned in the groove as shown in Fig. 1. The key 15 fits snugly into the groove 13 of the splice plate 12, but it can also be formed integrally with the plate if desired. The key 15 has a projecting portion 16 which engages the recesses 11 of the adjacent extremities of the rails, (as shown in Fig. 3), and is made so as not to contact with the filler 14 provided in the opposite face plate 12. The face plates 12 are also provided with a series of orifices 18 registering with orifices 18 of the fillers, and orifices 19 in the webs of the rails. Engaging these orifices are bolts 20 which bind the plates to the rail and thereby form the joint.

The recesses 11 formed in the extremities of the webs of the rails 10 are substantially equal to half of the length of the projecting portion 16. A clearance space is formed when the rails are placed in position as shown in Fig. 3, so that the distance between the extremities of the rails is equal to the sum of the distance on each side of the key in the recesses 11. Similarly, a clearance is provided in the orifices 19 of the rail, all for the purpose of expansion and contraction of the rails. The thickness of the key and the recesses being the same, the key fits tightly into the sides of the recesses.

The wooden fillers provided in the splice plates contacting with the sides of the webs of the rails form a firm grip on the surface when forced against the side of the webs by means of the bolts 20. The wooden fillers being compressed slightly by the bolts against the web, form a slightly resilient body, preventing the unscrewing of the nuts on the bolts by the vibration of a passing train. The key 15 having the projection 16 within the recesses 11, supports the extremities of the rails when a train is passing over, preventing the bending of the ends of the rail, and in consequence of this projection of the key, the two extremities of the rail are locked with each other. The reverse arrangement of the bolts 20, as shown in Figs. 2 and 3, is to afford a protection in case the nuts on one side are cut off by some accident of a derailing train. The heads on the same side form a smooth surface on which the wheel will slide, and therefore prevent the dislocation of the joint.

Having thus described my invention, I claim as new and desire to secure by Letters Patent:

1. In a rail joint, each extremity of the webs of the rails having a recess therein, a pair of splice plates, fillers of material in said plates of a higher coefficient of friction with the webs of the rail than said plates, said fillers adapted to contact with the sides of the webs of the rail when the joint is formed, one of said plates having means adapted to engage said recesses in the rails, and means for clamping said plate to the rails.

2. In a rail joint, each extremity of the webs of the rails having a recess therein, a pair of splice plates, fillers of wood in said plates adapted to contact with the sides of the web of the rail, one of said plates having means adapted to engage said recess in the rails, and means for clamping said plates to the ends of the rails.

3. In a rail joint, each extremity of the webs of the rails having a recess therein, a pair of splice plates each having a longitudinal groove in the face opposite the web of the rail, one of said plates having a projecting portion adapted to engage the recesses in said extremities of the rail, wooden fillers in said grooves of said plates, adapted to contact with the webs of the rail, and means for connecting said plates to the rails.

4. In a rail joint, each extremity of the webs of the rails having a recess, a pair of splice plates each having a longitudinal groove extending through the entire length of said plate, and lying opposite the side of the web of the rail, a key in the groove in one of said plates, substantially midway its ends, said key having a projection adapted to engage said recesses in said rails, wooden fillers in said grooves adapted to contact with the sides of the webs of the rail, and means for connecting said plates to the rails.

5. In a rail joint, each extremity of the webs of the rails having a recess, a pair of splice plates each having a longitudinal groove extending through the entire length of the plate, and facing the sides of the webs of the rails when forming the joint, said grooves having a curved bottom, a key in the groove of one of said plates substantially midway the ends of the plate, said key having a head portion fitting snugly into said groove, and a projecting portion fitting tightly between the upper and lower sides of said recess in the webs of the rails, wooden fillers in said grooves, and means for binding said plates to the rails.

In testimony whereof I have signed my name to this specification in the presence of two subscribing witnesses.

JOHN F. FORSYTH.

Witnesses:
   JOHN T. WOODWARD,
   THOMAS F. HAYS.

---

Copies of this patent may be obtained for five cents each, by addressing the "Commissioner of Patents, Washington, D. C."